Oct. 27, 1959     F. C. SCHWANEKE     2,910,571
COOKING VESSEL
Filed June 26, 1956

*INVENTOR:*
FRED C. SCHWANEKE
BY
*ATTORNEY*

_United States Patent Office_

2,910,571
Patented Oct. 27, 1959

2,910,571

COOKING VESSEL

Fred C. Schwaneke, Chicago, Ill., assignor to Dormeyer Corporation, Chicago, Ill., a corporation of Illinois Application June 26, 1956, Serial No. 594,016

5 Claims. (Cl. 219—44)

This invention relates to automatically controlled electrically actuated skillets and more particularly to an automatic electrical skillet which may be almost entirely immersed in water for cleaning without damage to either the resistance elements or the automatic control therefor.

This invention is primarily directed to an automatic skillet in which the control mechanism is mounted remote from the skillet and in which novel means are provided for selecting a particular temperature at which the skillet may be operated and for adjusting the heat range so that particular heat levels may be selected with accuracy.

A primary object of the invention is, therefore, to provide an automatic skillet of the immersible type in which the thermostat, switch, wiring connections and controls therefor are mounted remotely from the skillet itself so that the skillet may be conveniently washed without danger of short circuits and wherein thermostat control means accurately senses the heat level at the surface of the skillet over a large area thereof for controlling the operation of the electrical circuit with accuracy.

A further object of the invention is to provide an improved skillet of the type described in which means are provided for selecting a particular temperature from a wide range and for setting a temperature within that range at which the skillet is to operate.

Other and further objects, advantages and features of the present invention will be apparent to those skilled in the art from the following description, taken in conjunction with the accompanying drawings in which similar reference characters relate to similar parts and in which.

Figure 1:
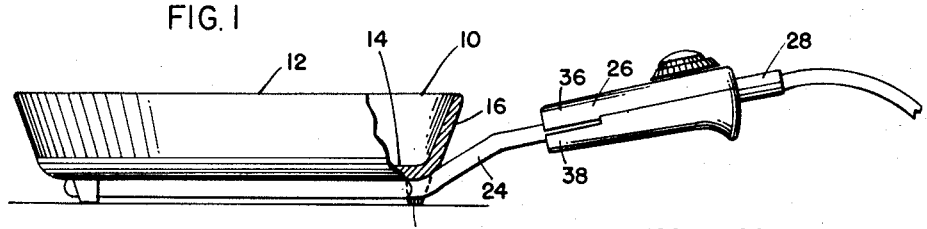
Fig. 1 is an elevational view, partly broken away and partly in section, of an automatic skillet made in accordance with the present invention.
Figure 2:
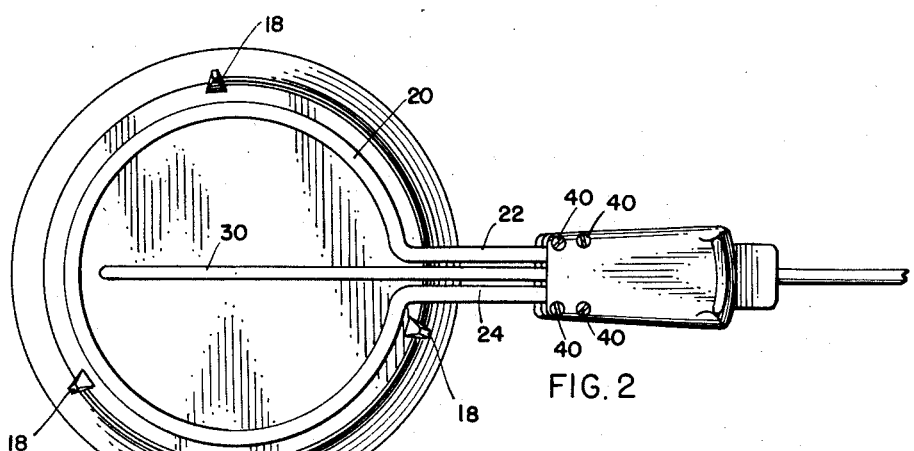
Fig. 2 is a bottom plan view of the automatic skillet of Fig. 1.

Referring now to the drawing and more particularly to Fig. 1, the skillet of the present invention, indicated generally by reference numeral 10, comprises a pan section 12 formed of aluminum, stainless steel or the like cast or spun to the shape shown with a bottom wall 14, an inclined sidewall 16 and circumferentially spaced legs 18 preferably formed integrally with the pan itself. Bonded to the bottom surface of the wall 14, as shown best in Fig. 2, is a generally circular heating element 20. The heating element 20 is preferably of the continuous sheathed or tubular type and is provided with upwardly and outwardly extending arms 22 and 24 which form, in conjunction with a hand grip 26, a handle for the pan section 12. The point of juncture of the arms 22 and 24 with the grip 26 is remote from the pan section 12 and, since the heating element 20 and the arms 22 and 24 are integrally formed, the entire pan section and arms may be immersed up to this point of juncture for washing and the like without danger of water entering any spaces where a short circuit would occur. To the outer end of the hand grip 26 is connected a plug 28 for supplying electrical current to the skillet from a conventional electrical outlet.

According to the present invention, thermostatic means are provided for accurately and efficiently controlling the electrical circuit so that a predetermined temperature may be maintained on the surface of the bottom wall 14. In this connection, a hollow tube 30 is bonded to the undersurface of the bottom wall 14 of the pan section 12, preferably across the center thereof within the area defined by the heating element 20. By this arrangement, as will be apparent hereinafter, the thermostat is responsive to the mean temperature of the bottom wall 14 and, consequently, uniformity of heat level is provided throughout the area of the bottom wall 14.

The tube portion 30, of the thermostat which is desirably formed of a metal having a high coefficient of expansion such as aluminum or the like, is brazed to the bottom of the pan throughout their contacting area and extends upwardly and outwardly between the arms 22 and 24 and in substantial parallelism thereto where it is protected against damage. As shown best in Figs. 3 and 4, the outer end of the tube 30 is received within an opening 32 in the hand grip 26 and extends into a cavity 34 formed within the hand grip 26. For access to the cavity 34, the hand grip 26 is formed with mating housing sections 36 and 38 which are secured each to the other by means of set screws 40. Mounted within the cavity 34 and connected at 42 to the tube 30 is a bracket 44 having an upstanding lug 46 having a threaded aperture 48 for reception of a set screw 50.

Mounted within the tube 30 and secured thereto at its outer end as crimped at 52 is a wire 54 which is connected at its inner end to an arched spring 56. Guides 58, of non-heat conductive material are mounted at the mouth of the tube 30 to maintain the end of the wire 54 in guided relationship with the tube 30. Both the wire 54 and the spring 56 are formed of a metal characterized by a lower coefficient of heat expansion than the metal of the tube 30 and the bracket 44. In the present instance, the wire 54 is formed of stainless steel and the spring 56 of spring steel. The shape of the spring 56 is such that a flat 60 is provided on the upper surface to which is secured a ceramic button 62 for the purpose of making a dialectric mechanical drive contact with a switch blade 80, side panels 64 and 66 resiliently flex to move the button 62 vertically as viewed in Fig. 3. The inner end 64 of the spring 56 is connected to the outer end of the wire 54, and the outer end 66 of the spring 56 is provided with an upstanding flange 68 which is threaded on the inner end of the set screw 50 so that rotation of the screw displaces the outer end as held against rotation by sliding contact with the bracket 44.

Figure 3:
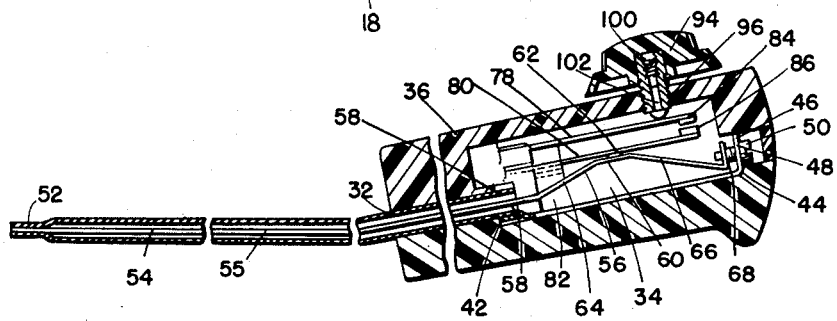
Fig. 3 is a greatly enlarged elevational sectional view, partly broken away, of a novel thermostatic control for the automatic skillet shown in Fig. 1.
Figure 4:
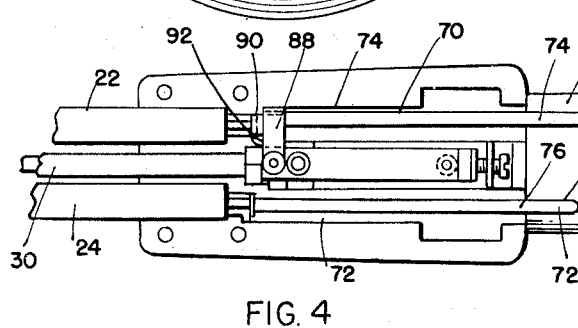
Fig. 4 is a plan view, on the same scale as Fig. 3, with part of the handle grip removed for the sake of clarity.

Referring now more particularly to Figs. 3 and 4, there is shown in these figures a switch, indicated generally by reference numeral 70, for controlling the operation of the electrical circuit so that a predetermined uniform temperature is maintained at the surface of the bottom wall 14 of the pan section 12. In the present instant, the circuit includes prongs 72 and 74 which may be engaged by corresponding contact sockets 76 in the female connector plug 28. The prong 72 is connected directly to one end of the heating element, while the other side of the circuit is connected in series with a switch 70 to the other end of the heating element. The switch 70 includes a pair of resilient contact blades 78 and 80 normally biased away from each other and mounted on a dielectric pedestal 82. The blades 78 and 80 are provided at their outer ends with electrical contacts 84 and 86 respectively. A bus bar 88 connects the prong 74 with the blade 78 while the lower blade 80 is connected to the heating element at 90 by means of a connector 92. When the contacts 84 and 86 are engaged current flows in the heating element, as will be understood.

The blade 78 may be moved into a predetermined position with respect to the blade 80 by means of a knob 94 having a shaft 96 threadedly received in an opening in the top of the upper section 36 of the hand grip 26. The knob 94 is calibrated so that the blade 78 is depressed a predetermined distance for a particular temperature which is indicated on the top surface of the upper section 36. In Fig. 3, the knob 94 is in "off" position, the contacts 84 and 86 are disengaged, and no current can flow through the circuit. In this figure, also, the button 62 on the spring 56 urges the contact blade 80 into the position shown.

When the bottom wall 14 of the skillet section 12 is heated, the tube 30 and the bracket 44 expand to a greater extent than the wire 54 with the result that the spring 56 which, at ambient temperatures assumes the position shown in Fig. 3, is stretched outwardly or flattened by the lesser expansion of the wire 54 and thus the ceramic button 62 is moved away from the blade 78 and the blade 80 following this movement carries the contact out of engagement with the contact 84 to break the circuit. Initially, the contacts are adjusted to break contact at a particular temperature level by the screw 50 on the bracket 44 or by adjusting of the height of the button 62 by means of adjusting a set screw 100 threaded in the sleeve to support a ceramic pin 102 in the sleeve shaft of the knob 94 or both. Thereafter, rotation of the knob 94 determines the temperature level at which the switch is opened. The present thermostatic control device is thus characterized by an extremely high degree of accuracy and consistency.

Consequently, having described the invention and its operation in its preferred form it will be apparent how the objects stated are attained and how various changes and modifications can be made without departing from the spirit of the invention, the scope of which is commensurate with the appended claims.

What is claimed is:

1. An immersible automatic electric skillet including a generally circular heating element on the bottom surface thereof, said heating element having integral arms extending upwardly and outwardly in substantial parallelism to form part of a handle, an electrical circuit for said heating element, a hollow hand grip formed of heat insulating material and connected to said arms at a point remote from said skillet, a switch mounted within said grip and thermostatic means for maintaining the surface of said skillet at a predetermined temperature level, said switch including resilient contact arms biased out of contact with each other, manually actuable means for urging one of said arms to a predetermined position with respect to the other of said arms, said thermostatic means including a hollow tube bonded to the bottom surface of said skillet in spaced relation to said heating element and extending upwardly and outwardly in parallel relation to said arms and into a first end of said hollow hand grip, a bracket connected to the interior of a second end of the hollow handle, a wire positioned within said hollow tube and connected at one end to the free end thereof, and a resilient bar connected at one end to said wire and at the other end to said bracket and operative normally to urge said other arm into contact with said one arm, said wire and said resilient bar having a lower coefficient of heat expansion than said tube and said bracket so that upon a predetermined expansion of said tube and bracket said resilient bar is stretched to afford movement of said other arm away from said one arm thereby deenergizing said circuit.

2. An immersible automatic electric skillet including a generally circular heating element on the bottom surface thereof, said heating element having integral arms extending upwardly and outwardly in substantial aparallelism to form part of a handle, an electrical circuit for said heating element, an elongated hollow hand grip formed of heat insulating material and connected to said arms at a point remote from said skillet, a switch mounted within said grip and thermostatic means for maintaining the surface of said skillet at a predetermined temperature level, said switch including resilient contact arms biased out of contact with each other, manually actuable means for urging one of said arms to a predetermined position with respect to the other of said arms, said manually actuable means including a calibrated knob positionable to afford a pre-selected temperature in said skillet, said thermostatic means including a hollow tube bonded at one end to the bottom surface of said skillet in spaced relation to said heating element and extending upwardly and outwardly at its other end in parallel relation to said arms and into a first end of said hand grip, a bracket connected at one end thereof to said other end of said hollow tube, a wire received within said hollow tube and connected at one end to said one end of the hollow tube, and a resilient bar connected at one of its ends to the other end of said wire and at the other one of its ends to said bracket and operative normally to urge said other arm into contact with said one arm, said wire and said resilient bar having a lower coefficient of heat expansion than said tube and said bracket so that upon a predetermined expansion of said tube and bracket said resilient bar is stretched to afford movement of said other arm away from said one arm thereby deenergizing said circuit.

3. An immersible electric cooking vessel comprising a pan, an electrical resistance unit bonded to the undersurface of said pan and having end portions extending outwardly of said pan in radial alignment therewith, an elongated hollow hand grip connected to said electrical resistance unit, said end portions joining said hand grip at a predetermined distance from said pan, a series circuit for said resistance unit, means for controlling the operation of said circuit for maintenance of a predetermined temperature in said pan, said means including a metallic tube arranged in heat exchange relation to said pan at one end and extending at the other end into said grip, a bracket of the same metal as said tube arranged within said grip and secured in heat exchange relation to said tube, a wire of a metal characterized by a lesser coefficient of expansion than the metal of said tube and said bracket arranged within and secured at one end to said one end of said tube, said circuit including a switch having superimposed contact arms, means for urging the upper arm into a predetermined position with respect to said lower arm, means interconnecting said bracket and the other end of the wire for normally urging the lower arm into contact with said upper arm and operative when the temperature in said pan reaches a predetermined level to move said lower arm out of contact with said upper arm.

4. Thermostatic control apparatus for an immersible skillet including a generally circular heating element on the bottom surface thereof, said heating element having integral arms extending upwardly and outwardly in substantial parallelism to form part of a handle, an electrical circuit for said heating element, a hollow hand grip completing the handle, a hollow tube bonded to the undersurface of said skillet in spaced relation to said heating element and extending upwardly and outwardly in parallel relation to said arms into said hollow hand grip, said hand grip being spaced a predetermined distance from said pan, a switch having flexible contact arms mounted within said hand grip and forming part of said circuit, manually actuable means for urging one of said arms to a predetermined position, and means associated with said hollow tube for normally urging the other of said arms into contact with said one arm for energization of said heating element and affording movement of said other arm away from said one arm for denergization of said heating element when the temperature in said skillet reaches a predetermined level, said last-named means including a bracket mounted within said hand grip in the end remote from the pan of and bonded to said tube, a wire mounted within said tube, said tube and wire being secured to each other at their ends remote from said handle, a resilient bar connected at one end to the other end of said wire and to the bracket at its other end, said bar being formed of a metal characterized by a lower coefficient of heat expansion than said tube and said bracket, said bar normally supporting said other arm in contact with said one arm whereby upon expansion of said tube and said bracket the resilient bar is flexed away from said other arm to afford movement of said other arm out of contact with said one arm and said heating element is deenergized.

5. An immersible automatic electric skillet including a generally circular heating element on the bottom surface thereof, said heating element having integral arms extending upwardly and outwardly in substantial parallelism to form part of a handle, an electrical circuit for said heating element, an elongated hollow hand grip formed of heat insulating material and connected to said arms at a point remote from said skillet to provide air space around said integral arms between the handle grip and skillet, thermostatic means for maintaining the surface of said skillet at a predetermined temperature level including a switch mounted within said grip and comprising resilient contact arms biased out of contact with each other, manually actuable means for urging one of said arms to a predetermined position with respect to the other of said arms, said manually actuable means including a calibrated knob positionable to afford a preselected temperature in said skillet, said thermostat means also including a hollow tube having an end portion terminally sealed and bonded to the bottom surface of said skillet in spaced relationship to said heating element and a free end portion extending upwardly and outwardly into said hand grip along with said arms, a bracket within the hollow portion of said hand grip attached to the free end of said tube, a wire extending through said hollow tube and attached at one end to the sealed end of said tube, a resilient bar attached at an end to the other end of said wire, adjustable means interconnecting the other end of the resilient bar to said bracket for loosening and tightening said wire and said resilient bar to establish a predetermined relationship therebetween, said bar being operative in said predetermined relationship to urge said other arm into contact with said one arm, said wire and said resilient bar having a lower coefficient of heat expansion than said tube and said bracket so that upon a predetermined expansion of said tube and bracket said resilient bar is stretched to move said other arm away from said one arm thereby deenergizing said circuit.

References Cited in the file of this patent
UNITED STATES PATENTS

| | | |
|---|---|---|
| 1,723,239 | Howe | Aug. 6, 1929 |
| 1,732,182 | Denison | Oct. 15, 1929 |
| 2,618,722 | De Witt | Nov. 18, 1952 |
| 2,666,836 | Stiebel | Jan. 19, 1954 |
| 2,742,546 | Cart | Apr. 17, 1956 |
| 2,744,995 | Jepson | May 8, 1956 |
| 2,769,878 | Krichton | Nov. 6, 1956 |
| 2,793,270 | Burch et al. | May 21, 1957 |

FOREIGN PATENTS

| | | |
|---|---|---|
| 458,900 | Great Britain | Dec. 29, 1936 |